United States Patent
Reger et al.

(10) Patent No.: US 7,506,127 B2
(45) Date of Patent: Mar. 17, 2009

(54) RECONFIGURATION OF STORAGE SYSTEM INCLUDING MULTIPLE MASS STORAGE DEVICES

(75) Inventors: Brad A. Reger, Dublin, CA (US); Susan M. Coatney, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 449 days.

(21) Appl. No.: 10/826,757

(22) Filed: Apr. 15, 2004

(65) Prior Publication Data

US 2004/0199607 A1 Oct. 7, 2004

Related U.S. Application Data

(63) Continuation-in-part of application No. 10/407,681, filed on Apr. 4, 2003, now Pat. No. 7,127,798, and a continuation-in-part of application No. 10/027,457, filed on Dec. 21, 2001, and a continuation-in-part of application No. 10/027,020, filed on Dec. 21, 2001, now Pat. No. 7,296,068, and a continuation-in-part of application No. 10/027,013, filed on Dec. 21, 2001, now Pat. No. 7,146,522.

(51) Int. Cl.
  *G06F 12/00* (2006.01)
(52) U.S. Cl. .................................... 711/170
(58) Field of Classification Search ........................ None
  See application file for complete search history.

(56) References Cited

U.S. PATENT DOCUMENTS

| | | | |
|---|---|---|---|
| 5,193,050 A * | 3/1993 | Dimmick et al. ............. | 361/694 |
| 5,555,438 A | 9/1996 | Blech et al. | |
| 5,850,562 A | 12/1998 | Crump et al. | |
| 5,975,738 A * | 11/1999 | DeKoning et al. ............ | 700/79 |
| 6,404,624 B1 | 6/2002 | Jeong | |
| 6,473,371 B1 * | 10/2002 | White ...................... | 369/30.72 |
| 6,625,747 B1 * | 9/2003 | Tawil et al. .................... | 714/6 |
| 6,651,902 B2 * | 11/2003 | Ehinger et al. .............. | 239/104 |
| 6,658,504 B1 | 12/2003 | Lieber et al. | |
| 6,687,797 B1 | 2/2004 | Walton | |

(Continued)

FOREIGN PATENT DOCUMENTS

JP 2000276534 A 10/2000

OTHER PUBLICATIONS

Kenniston, Steve, "Unified Storage Technology", Enterprise Storage Group, Technology Brief, Network Appliance, pp. 1-2, Milford Massachusettes, Dec. 2002.

(Continued)

*Primary Examiner*—Hyung S Sough
*Assistant Examiner*—Shawn Eland
(74) *Attorney, Agent, or Firm*—Blakely, Sokoloff, Taylor & Zafman LLP

(57) ABSTRACT

A storage system includes a plurality of mass storage devices and a first storage server head to access the mass storage devices in response to client requests, wherein the first storage server head has ownership of the plurality of mass storage devices. Ownership of at least one of the mass storage devices is reassigned to a second storage server head independently of how the second storage server head is connected to the plurality of mass storage devices.

3 Claims, 19 Drawing Sheets

U.S. PATENT DOCUMENTS

| | | |
|---|---|---|
| 6,728,897 B1 | 4/2004 | Cramer et al. |
| 6,732,243 B2 | 5/2004 | Busser et al. |
| 6,732,289 B1 * | 5/2004 | Talagala et al. ............ 714/6 |
| 6,765,791 B2 | 7/2004 | Syring et al. |
| 6,789,149 B1 | 9/2004 | Bhadsavle et al. |
| 6,868,417 B2 | 3/2005 | Kazar et al. |
| 6,873,627 B1 | 3/2005 | Miller et al. |
| 6,920,579 B1 | 7/2005 | Cramer et al. |
| 6,920,580 B1 | 7/2005 | Cramer et al. |
| 6,934,158 B1 | 8/2005 | Teachout et al. |
| 6,948,012 B1 | 9/2005 | Valin et al. |
| 7,127,798 B1 | 10/2006 | Reger et al. |
| 2003/0065780 A1 * | 4/2003 | Maurer et al. ............ 709/225 |
| 2003/0065841 A1 | 4/2003 | Pecone |
| 2003/0097487 A1 | 5/2003 | Rietze et al. |
| 2003/0105931 A1 * | 6/2003 | Weber et al. ............ 711/162 |
| 2004/0133718 A1 | 7/2004 | Kodama et al. |
| 2004/0199719 A1 | 10/2004 | Valin et al. |

OTHER PUBLICATIONS

"Network Appliance Unified Storage Solutions", TR 3195, Network Appliance, Inc., Sunnyvale, California, pp. 1-5, Oct. 1, 2002.

"An architecture for componentized, network-based media services"; Harville, M.; Covell, M.; Wee, S.; Multimedia and Expo, 2003. ICME '03. Proceedings. vol. 2, Jul. 6-9, 2003; pp. II-333-6.

Microsoft Computer Dictionary, Fifth Edition, from "background" to "Backspace key", p. 48.

* cited by examiner

RECONFIGURATION OF STORAGE SYSTEM INCLUDING MULTIPLE MASS STORAGE DEVICES

This application is a continuation-in-part of:

U.S. patent application Ser. No. 10/027,457 of S. Coatney et al., filed on Dec. 21, 2001 and entitled, "System and Method of Implementing Disk Ownership in Networked Storage," which was published on Jun. 26, 2003 as U.S. patent application publication no. 2003/0120743 (hereinafter "Coatney");

U.S. patent application Ser. No. 10/027,020 of J. Sen Sarma et al., filed on Dec. 21, 2001 and entitled, "System and Method for Transferring Volume Ownership in Networked Storage" (hereinafter "Sarma");

U.S. patent application Ser. No. 10/027,013 of A. Rowe et al., filed on Dec. 21, 2001 and entitled, "System and Method for Allocating Spare Disks in Networked Storage," which issued on Dec. 5, 2006 as U.S. Pat. No. 7,146,522 (hereinafter "Rowe"); and U.S. patent application Ser. No. 10/407,681 of B. Reger et al., filed on Apr. 4, 2003 and entitled, "Method and Apparatus for Converting Disk Drive Storage Enclosure into a Standalone Network Storage System and Vice Versa," which issued on Oct. 31, 2006 as U.S. Pat. No. 7,127,798 (hereinafter "Reger");

each of which is incorporated herein by reference.

FIELD OF THE INVENTION

At least one embodiment of the present invention pertains to data storage systems, and more particularly, to a technique for reconfiguring a storage system.

BACKGROUND

Modern computer networks can include various types of storage servers. Storage servers can be used for many different purposes, such as to provide multiple users with access to shared data or to back up mission critical data. A file server is one type of storage server, which operates on behalf of one or more clients to store and manage shared files in a set of mass storage devices, such as magnetic or optical storage based disks or tapes. The mass storage devices are typically organized into one or more volumes of Redundant Array of Independent (or Inexpensive) Disks (RAID).

One configuration in which a file server can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the Filer products made by Network Appliance, Inc. in Sunnyvale, Calif.

A storage server can also be employed in a storage area network (SAN). A SAN is a highly efficient network of interconnected, shared storage devices. In a SAN, the storage server (which may be an appliance) provides a remote host with block-level access to stored data, whereas in a NAS configuration, the storage server provides clients with file-level access to stored data. Some storage servers, such as certain Filers from Network Appliance, Inc. are capable of operating in either a NAS mode or a SAN mode, or even both modes at the same time. Such dual-use devices are sometimes referred to as "unified storage" devices. A storage server such as this may use any of various protocols to store and provide data, such as Network File System (NFS), Common Internet File system (CIFS), Internet SCSI (ISCSI), and/or Fibre Channel Protocol (FCP).

Historically, file server systems used in NAS environments have generally been packaged in either of two forms: 1) an all-in-one custom-designed system that is essentially just a standard computer with built-in disk drives, all in a single chassis; or 2) a modular system in which one or more sets of disk drives (each set being mounted in a separate chassis) are connected to a separate external file server "head". Examples of all-in-one file server systems are the F8x, C1xxx and C2xxx series Filers made by Network Appliance, Inc. Examples of modular filer heads are the F8xx and FAS9xx heads made by Network Appliance, Inc.

In this context, the term "head" means all of the electronics, firmware and/or software that is used to control access to storage devices in a storage system; it does not include the disk drives themselves. In a file server, the head normally is where all of the "intelligence" of the file server resides. Note that a "head" in this context is not the same as, and is not to be confused with, the magnetic or optical head used to physically read or write data to a disk.

In a modular file server system, the system can be built up by adding multiple disk enclosures in some form of rack and then cabling the disk enclosures together. The disk drive enclosures are often called "shelves", and more specifically, "just a bunch of disks" (JBOD) shelves. The term JBOD indicates that the enclosure essentially contains only physical storage devices and no substantial electronic "intelligence". Some disk drive enclosures include one or more RAID controllers, but such enclosures are not normally referred to as "JBOD" due to their greater functional capabilities.

Modular storage systems and all-in-one storage systems each have various shortcomings, as noted in Reger (referenced above). Reger describes a standalone network storage server that overcomes some of the shortcomings of modular storage systems and all-in-one storage systems. The standalone storage server includes multiple internal single-board heads and multiple internal disk drives, all contained within a single chassis and connected to each other by an internal passive backplane. Each head contains the electronics, firmware and software along with built-in I/O connections to allow the disks in the enclosure to be used as a NAS file server and/or a SAN storage device.

Reger also describes that the standalone storage server can be easily converted into a JBOD shelf (essentially, by removing the internal heads and replacing them with I/O modules) and then integrated into a modular storage system such as described above. This allows a storage system to be grown in capacity and/or performance by combining the converted JBOD shelf with one or more separate (modular), more-powerful file server heads, such as Network Appliance F8xx or FAS9xx series heads, and additional JBOD shelves.

Although this convertability makes the standalone storage server very versatile, reconfiguring a storage system in this manner is not a trivial task. This type of system reconfiguration can require fairly extensive rerouting and addition of cables to allow the modular heads to control the disks in the newly-converted JBOD shelf (converted from the standalone storage server). In many storage systems with redundant heads, each disk is "owned" by (primarily accessed by) only one head, and disk ownership is determined by the cable connections. For example, in some systems, each disk has two external ports, port A and port B, which are connected (at least indirectly) to two separate heads. Only the head connected to port A owns the disk, while the head connected to port B assumes a backup role for purposes of accessing that disk.

To integrate a converted JBOD shelf into a modular system in the manner described above requires reassigning ownership of all of the disks in the converted JBOD shelf (which were owned by the removed internal heads) to an external modular head. As indicated above, such reassignment of ownership can require moving disks from one enclosure to another as well as extensive rerouting of cables and/or addition of new external cabling, all of which is inconvenient and complicated.

SUMMARY OF THE INVENTION

The present invention includes a method in which a storage system, which includes a plurality of mass storage devices and a first storage server head to access the mass storage devices in response to client requests, is operated, wherein the first storage server head has ownership of the plurality of mass storage devices. Ownership of at least one of the mass storage devices is reassigned to a second storage server head, independently of a manner in which the second storage server head is connected to the plurality of mass storage devices.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus to integrate a JBOD shelf, which has been converted from a standalone storage server, into a modular storage system are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As mentioned above, Reger describes a standalone network storage server that overcomes some of the shortcomings of modular and all-in-one storage systems. Reger also describes how the standalone storage server can be easily converted into a JBOD shelf and then integrated into a modular storage system. Described herein is a technique to integrate a JBOD shelf which has been converted from a standalone storage server, such as described in Reger, into a modular storage system.

Figure 1:
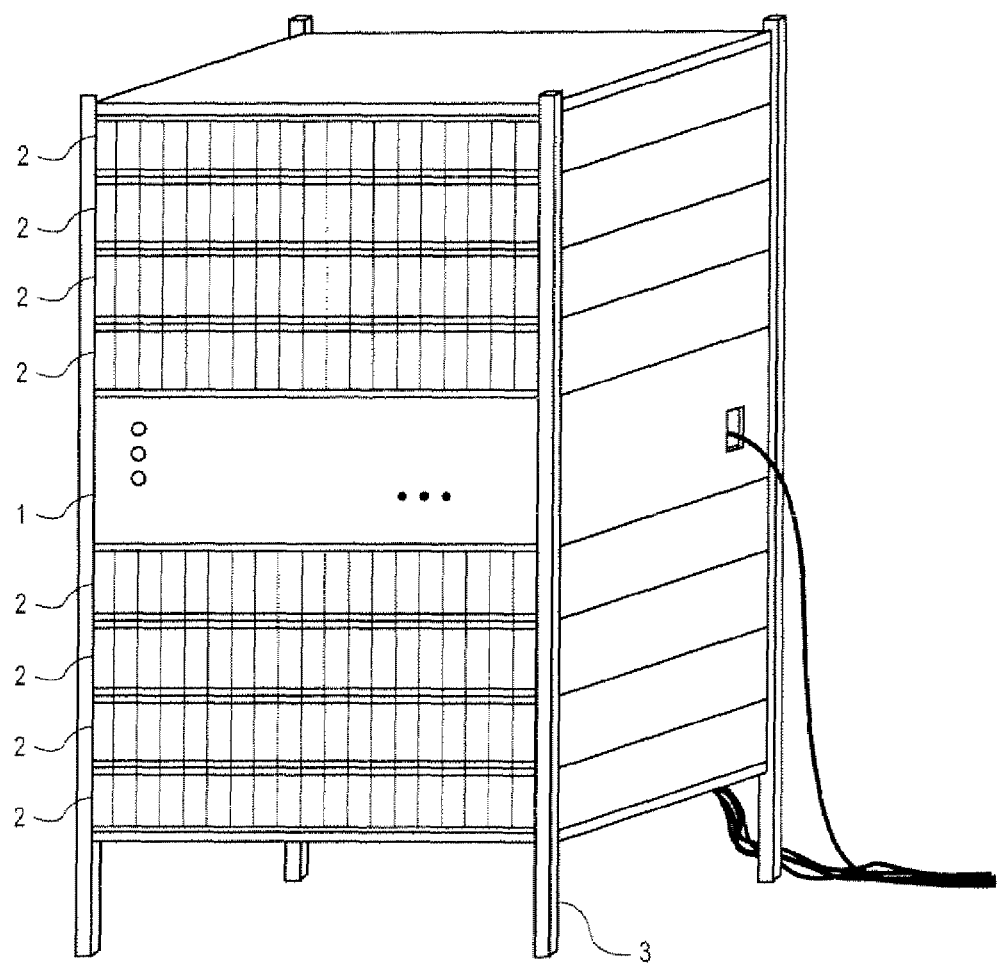
FIG. 1 illustrates a storage system that includes a storage server head and a set of JBOD shelves in a "rack and stack" configuration.

FIG. 1 illustrates an example of a modular file server system arranged in a "rack and stack" configuration. In FIG. 1, a file server head 1 is connected by external cables to multiple disk shelves 2 mounted in a rack 3. The file server head 1 enables access to stored data by one or more remote client computers (not shown) that are connected to the head 1 by external cables. The modular file server head 1 may be, for example, a F8xx or FAS9xx series Filer made by Network Appliance.

Figure 2:
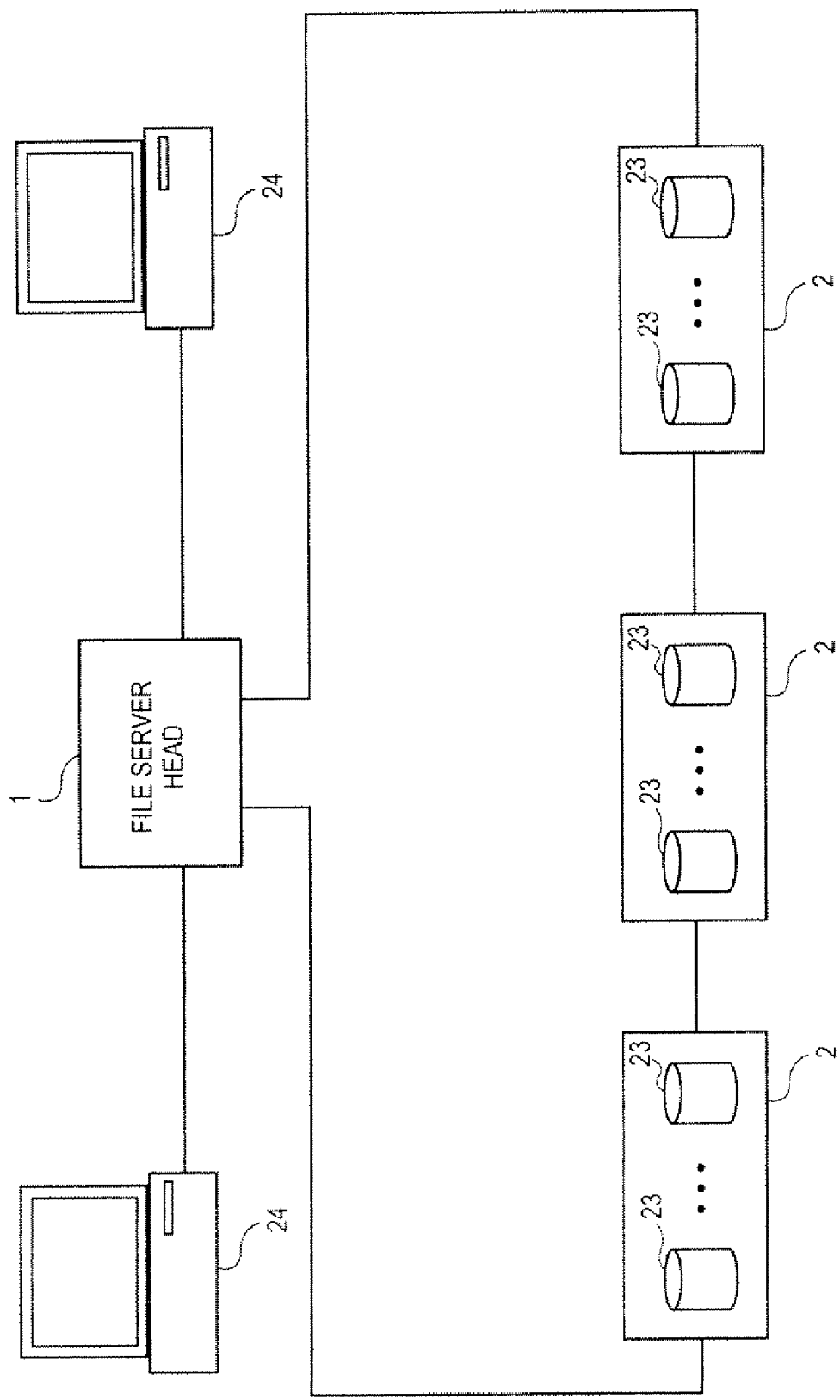
FIG. 2 is a block diagram showing how a file server head can be connected to a set of clients and a set of JBOD shelves.

FIG. 2 is a functional block diagram of a modular file server system such as shown in FIG. 1. The modular file server head 1 is contained within its own enclosure and is connected to a number of the external JBOD shelves 2 in a (logical) loop configuration. Each JBOD shelf 2 contains multiple disk drives 23 operated under control of the head 1 according to RAID protocols. The file server head 1 provides a number of clients 24 with access to shared files stored in the disk drives 23. Note that FIG. 2 shows a simple network configuration characterized by a single loop with three shelves 2 in it; however, other network configurations are possible. For example, there can be a greater or smaller number of JBOD shelves 2 in the loop; there can be more than one loop attached to the head 1; or, there can even be one loop for every JBOD shelf 2.

Figure 3:
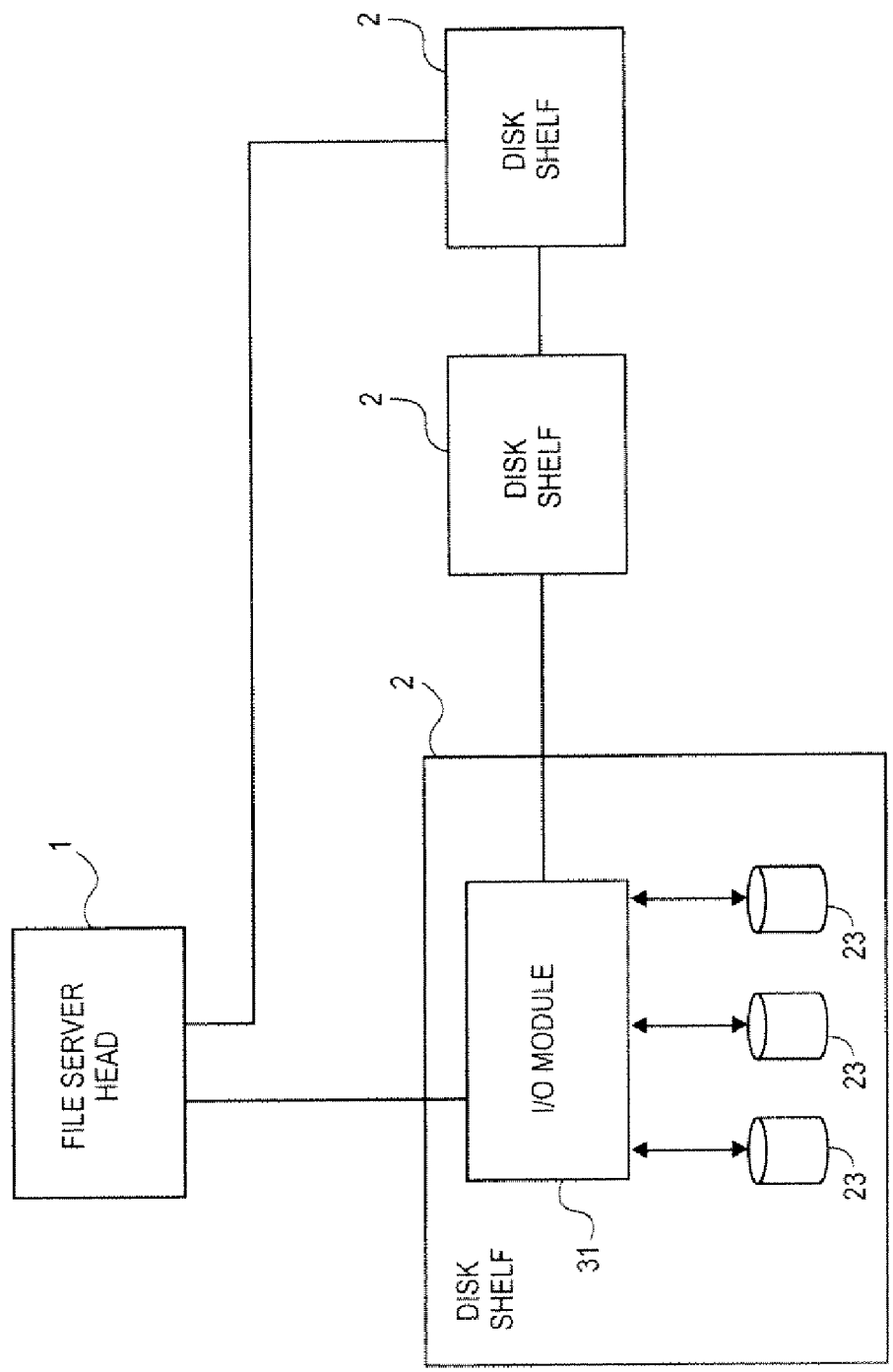
FIG. 3 is a block diagram similar to that of FIG. 2 but illustrating one of the JBOD shelves in greater detail.

FIG. 3 illustrates an example of a JBOD shelf 2 in greater detail (clients 24 are not shown). Each of the shelves 2 can be assumed to have the same construction. Each shelf 2 includes multiple disk drives 23. Each shelf also includes at least one I/O module 31, which is connected between the shelf 2 and the next shelf 2 in the loop and in some cases (depending on where the shelf 2 is placed in the loop) to the head 1. The I/O module 31 is a communications interface between the head 1 and the disk drives 23 in the shelf 2. The disk drives 23 in the shelf 2 can be connected to the I/O module 31 by a standard Fibre Channel connection, for example.

The I/O module 31, in addition to acting as a communications interface between the head 1 and the disk drives 23, also serves to enhance reliability by providing loop resiliency. Thus, in certain embodiments each I/O module 31 is a Loop Resiliency Circuit (LRC). If a particular disk drive 23 within a shelf 2 is removed or fails, the I/O module 31 in that shelf 2 simply bypasses the missing or failed disk drive and connects to the next disk drive within the shelf 2. In certain embodiments this functionality maintains connectivity of the loop in the presence of disk drive removals and is provided by multiple Port Bypass Circuits (PBCs) (not shown) included within the I/O module 31 (typically, a separate PBC for each disk drive 23 in the shelf 2).

Figure 4:
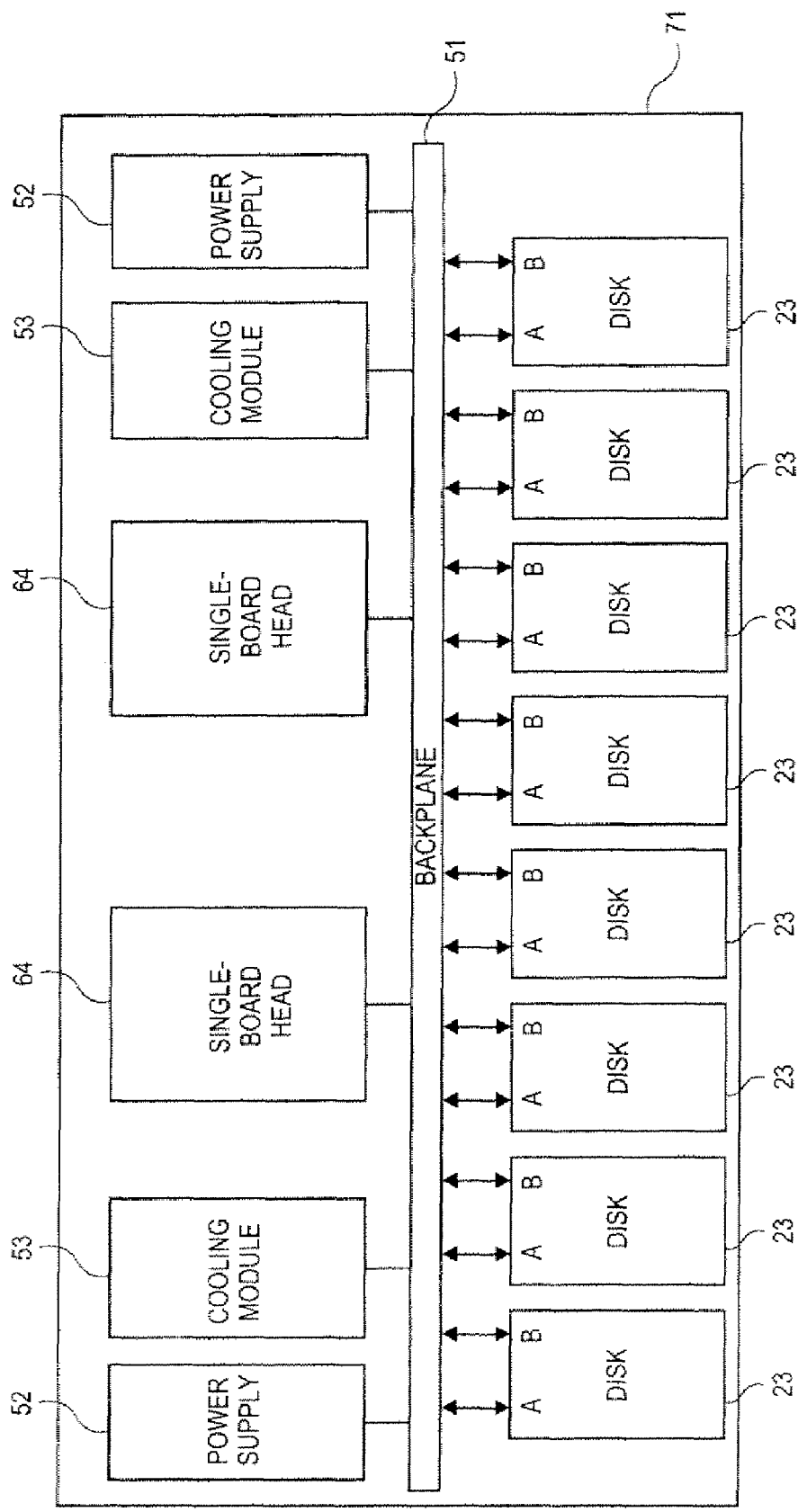
FIG. 4 shows a standalone storage server which includes two single-board heads and a set of disks.

FIG. 4 is a hardware layout block diagram of a standalone storage server such as described in Reger. The standalone storage server 71 includes multiple disk drives 23, multiple heads 64, and a passive backplane 51, all of which are contained within a single chassis. Each of the heads 64 is implemented on a separate, single circuit board. An example of the architecture of the single-board head 64 is described in Reger.

The heads 64 and disk drives 23 are all connected to, and communicate via, a passive backplane 51. The storage server 71 further includes a power supply 52 and a cooling module 53 for each head 64.

Figure 5:
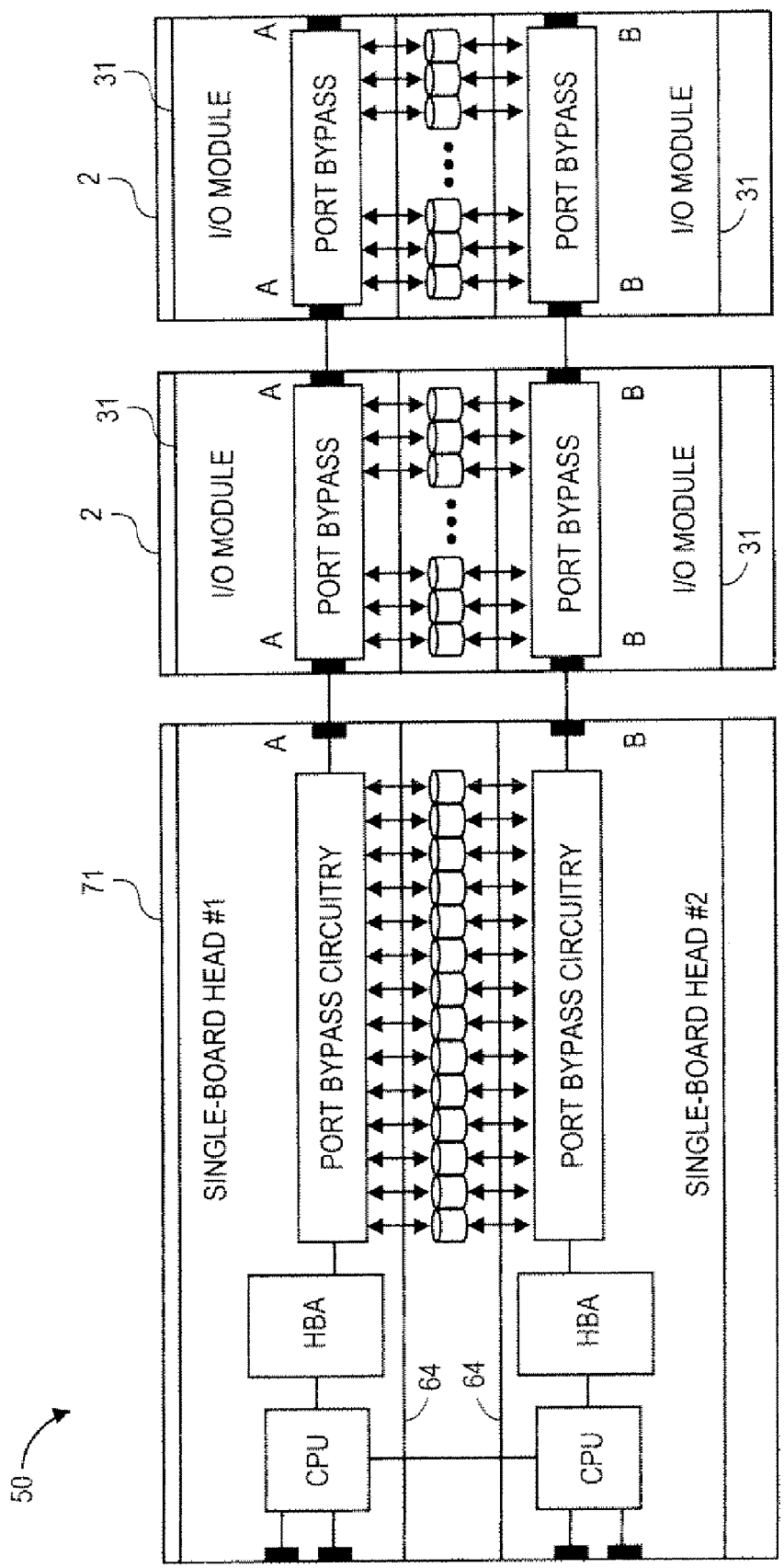
FIG. 5 shows a storage system which includes the standalone storage server coupled to a set of expansion JBOD shelves.
Figure 6A:
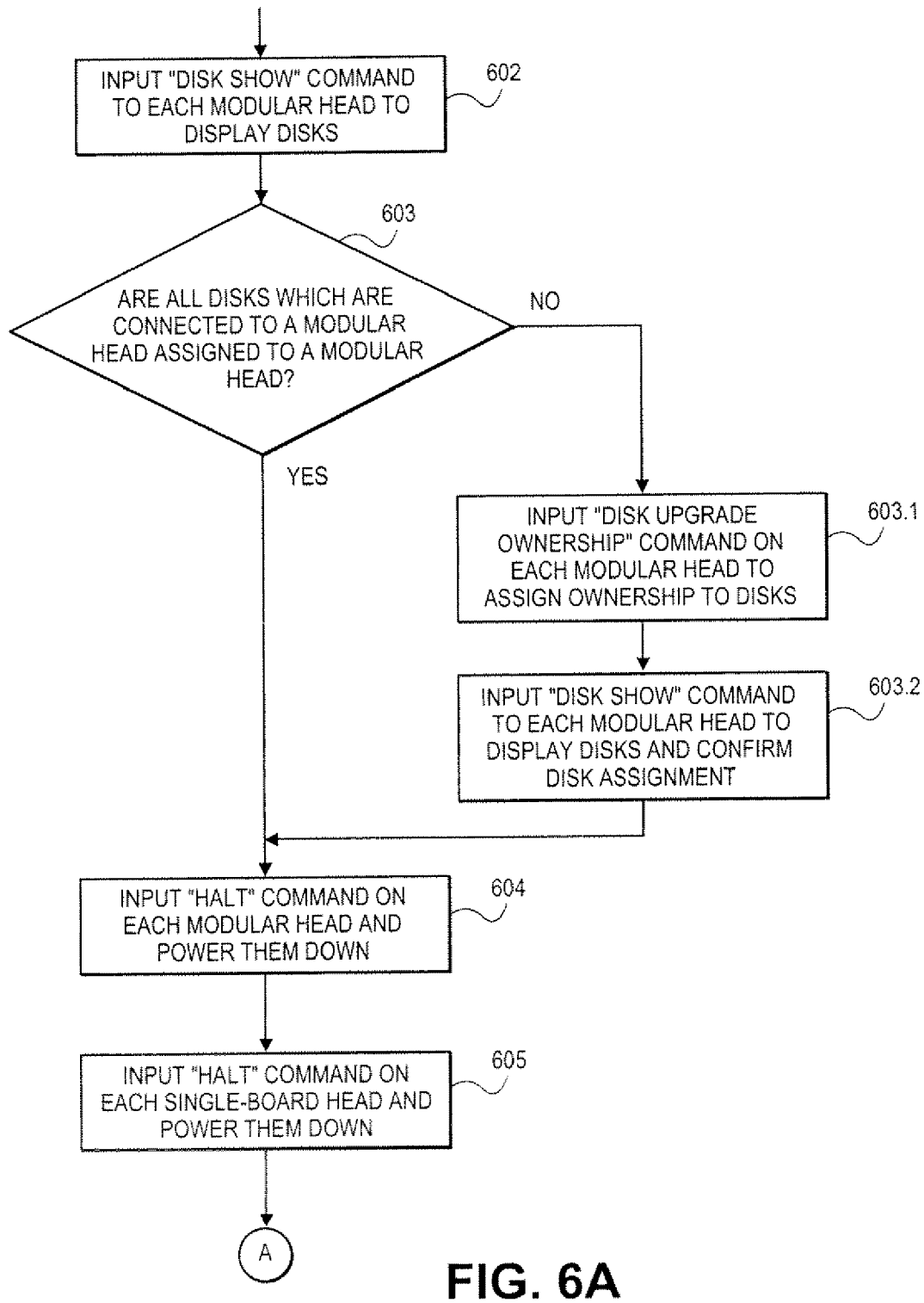
FIG. 6 is a flow diagram illustrating a process for converting the standalone storage server into a JBOD shelf and then integrating it, along with its expansion JBOD shelves, into a more powerful modular storage system.
Figure 6B:
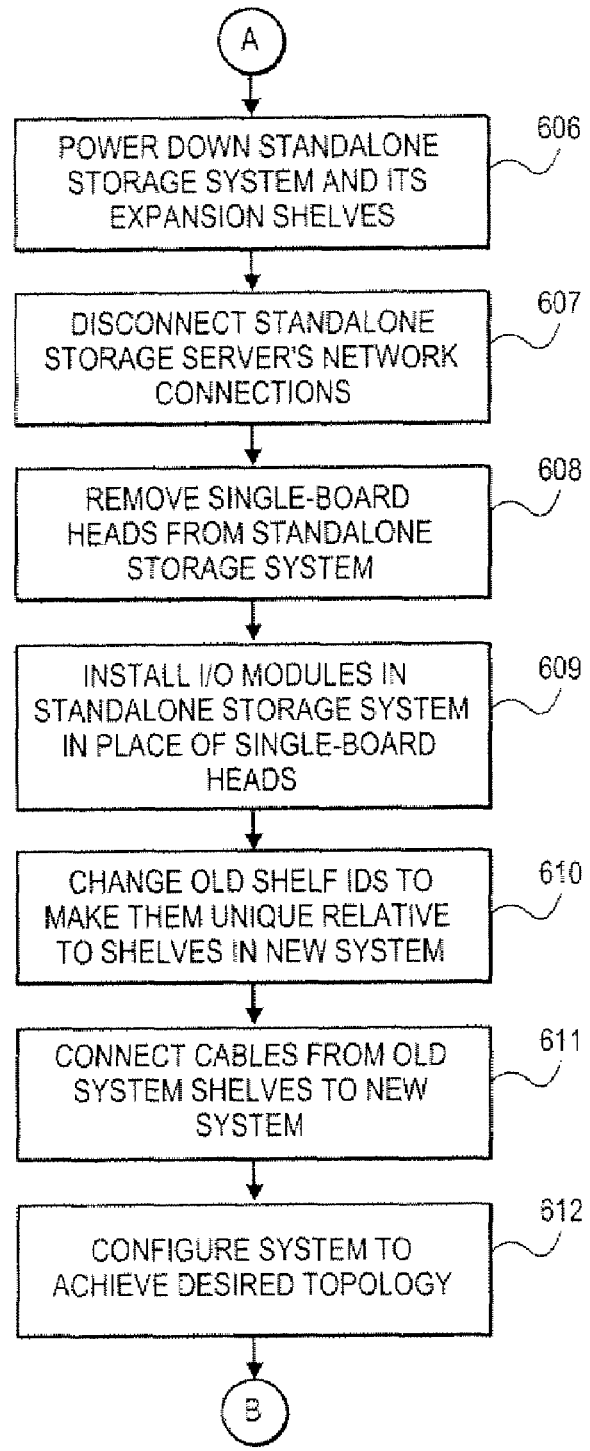
Figure 6C:
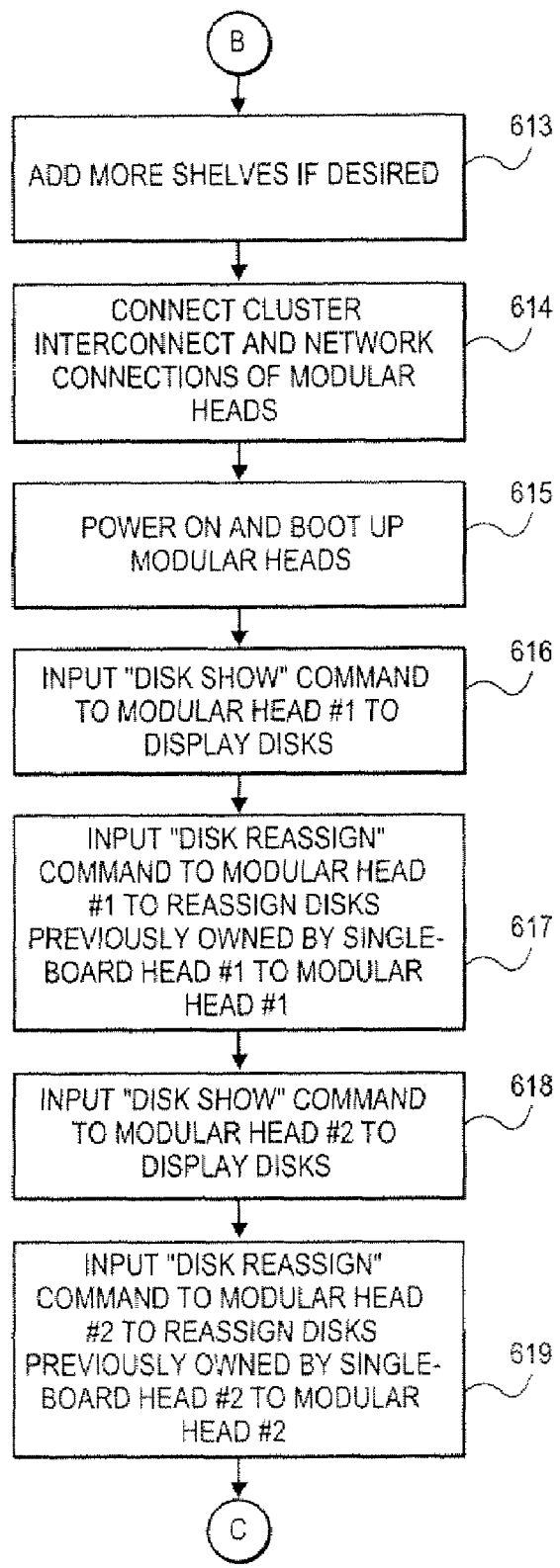
Figure 6D:
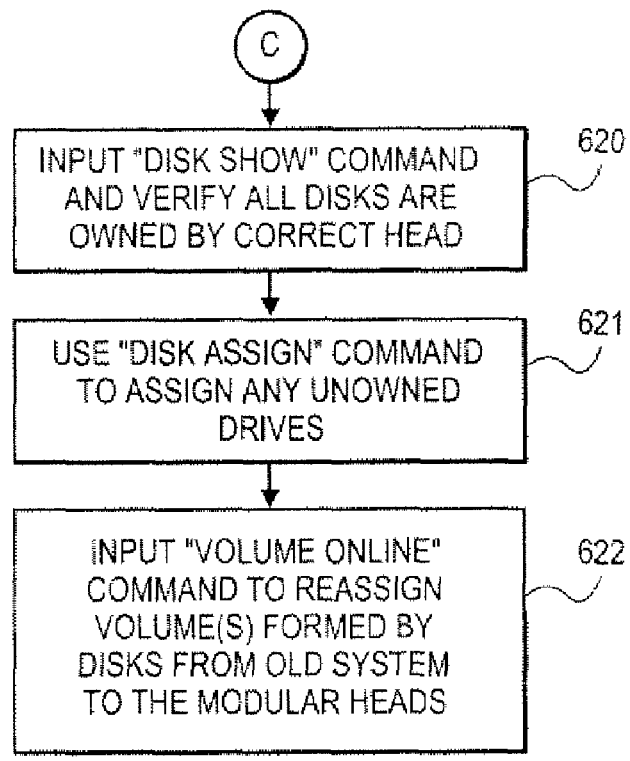

The standalone storage server 71 can be easily grown in capacity and/or performance by combining it with additional modular JBOD shelves 2, as shown in FIG. 5, and (optionally) with one or more separate, more powerful file server heads. Alternatively, the standalone storage server 71 can be converted into a JBOD shelf 2 by removing and replacing each of the heads 64 with an I/O module, such as I/O module 31 described above. The JBOD shelf thus created can then be integrated into a more powerful, modular storage system of the type described above regarding FIGS. 1 through 3. This allows the standalone storage system 71 to be easily upgraded by the user into a more powerful storage system.

A process of integrating a JBOD shelf, converted in this way, into a modular storage system will now be described with reference to FIGS. 5 through 16. For purposes of description, it is assumed that the starting point for the conversion is a storage system 50 shown in FIG. 5, which comprises the standalone storage server 71 coupled to two expansion JBOD shelves 2 in a daisy chain physical topology (which logically may form a loop such as shown in FIGS. 2 and 3). The standalone storage server 71 will be converted into a JBOD shelf and then integrated with a more powerful storage system 120, shown in FIG. 12. The more powerful system 120 initially comprises two modular (separate, external) storage heads 121, which may be, for example, FAS9xx series heads from Network Appliance, coupled to two expansion JBOD shelves 2 in a daisy chain physical topology.

It is further assumed that the single-board heads 64 in the standalone storage server 71, as well as the modular heads 121 (see FIG. 12) to which the converted shelf will be integrated, all support software (command) based assignment and modification of disk ownership, in the manner described in Coatney and Sarma (referenced above). As described in detail in Coatney and Sarma, disk ownership can be determined by storing disk ownership information (including the identity of the head which owns the disk) in a predetermined area on each disk. In this way, disk ownership can be assigned independently of the manner in which the head is connected to the disks, i.e., independently of the cabling configuration between the disks and the heads. This approach contrasts with prior techniques in which disk ownership was determined entirely by the cabling configuration between the disks and the heads. Note that the conversion process could be carried out in a system which does not implement disk ownership in this manner; however, the process would be more complicated, since it would require more extensive recabling between devices to implement the desired disk ownership scheme. Finally, it is assumed that the single-board heads 64 and the modular heads 121 all support the commands which are described as being input to them in the process which follows.

Figure 12:
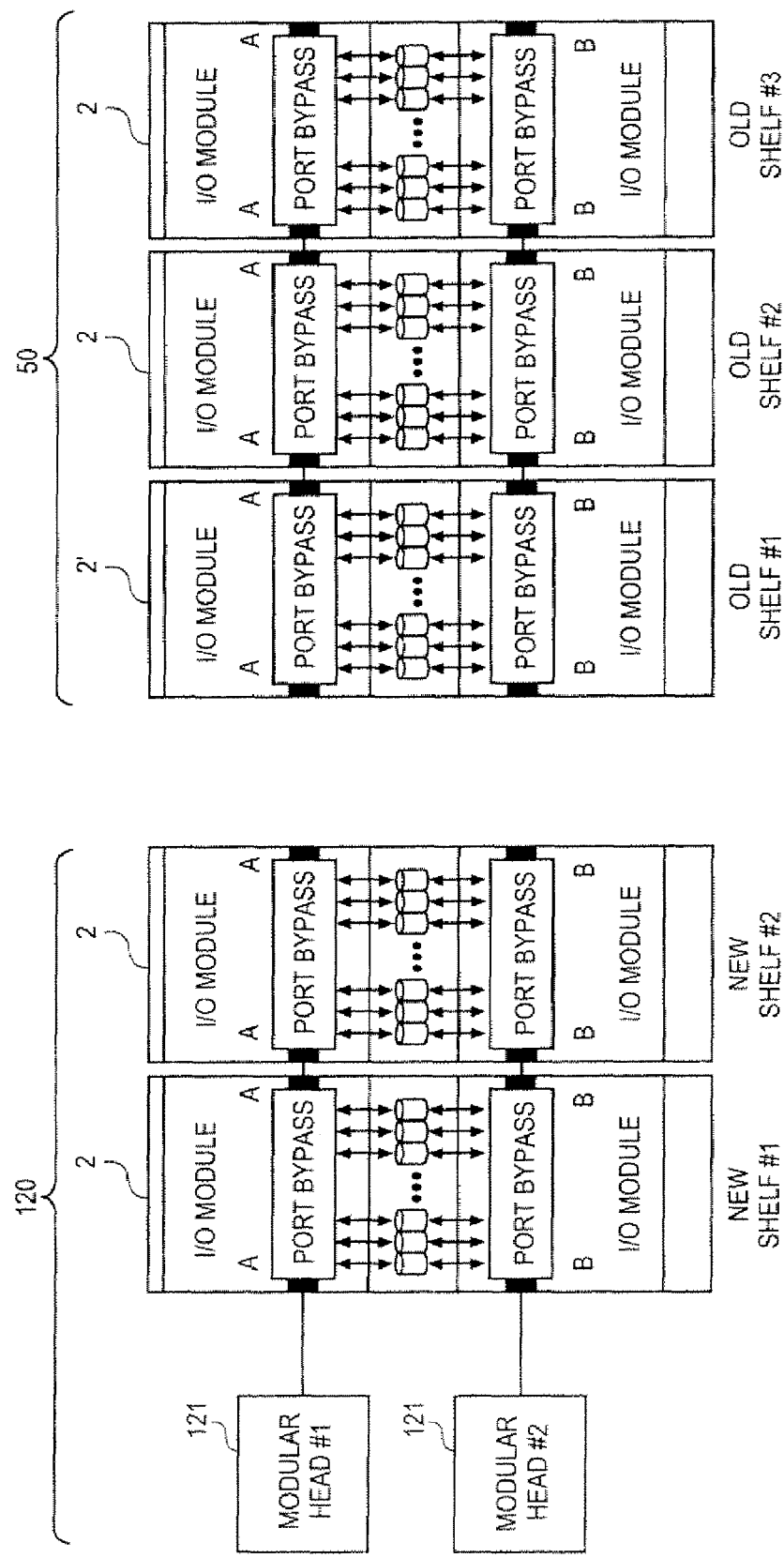

FIG. 6 illustrates a process for converting the standalone storage server 71 into a JBOD shelf 2 and then integrating it, along with its expansion JBOD shelves 2, into a more powerful modular storage system 120 such as shown in FIG. 12. Initially, system 50 contains the standalone storage server 71 and two expansion JBOD shelves 2, as shown in FIG. 5. It is assumed that the more powerful, modular system 120, into which it will be integrated, initially uses topology base disk ownership, i.e., disk ownership is determined by the physical connections between disks and heads. To begin the conversion process, therefore, the modular system 120 is first converted to a software-based ownership scheme, such as described in Coatney and Swarma.

The process begins at block 602, in which a network administrator inputs a "disk show" command to each modular head (602), which produces a display that identifies all disks owned by the modular heads 121. This command and the other commands described below may be input from an administrative console (not shown) that is connected to the modular heads 121 either directly or over a network. If all disks that are physically connected to the modular heads 121 are indicated as being assigned to a modular head, then the process proceeds to block 604. Otherwise, the administrator inputs a "disk upgrade ownership" command to each modular head 121, which causes all disks connected to each modular head 121 to be assigned to the modular head to which it is connected (and an indication of ownership to be stored on each disk) in the manner described in Coatney (603.1). The administrator then inputs the "disk show" command again to verify that all disks in the modular system have been properly assigned (603.2).

At block 604, the network administrator inputs a "halt" command to each of the modular heads 121 (FIG. 12). Next, the administrator inputs a "halt" command (block 605) to each of the single-board heads 64 in the standalone storage server 71 (FIG. 5). This may be done in essentially the same manner as for the modular heads 121, i.e., through an administrative console connected (either directly or indirectly) to the single-board heads. The halt command has the effect of flushing all user data to disks.

Figure 7:
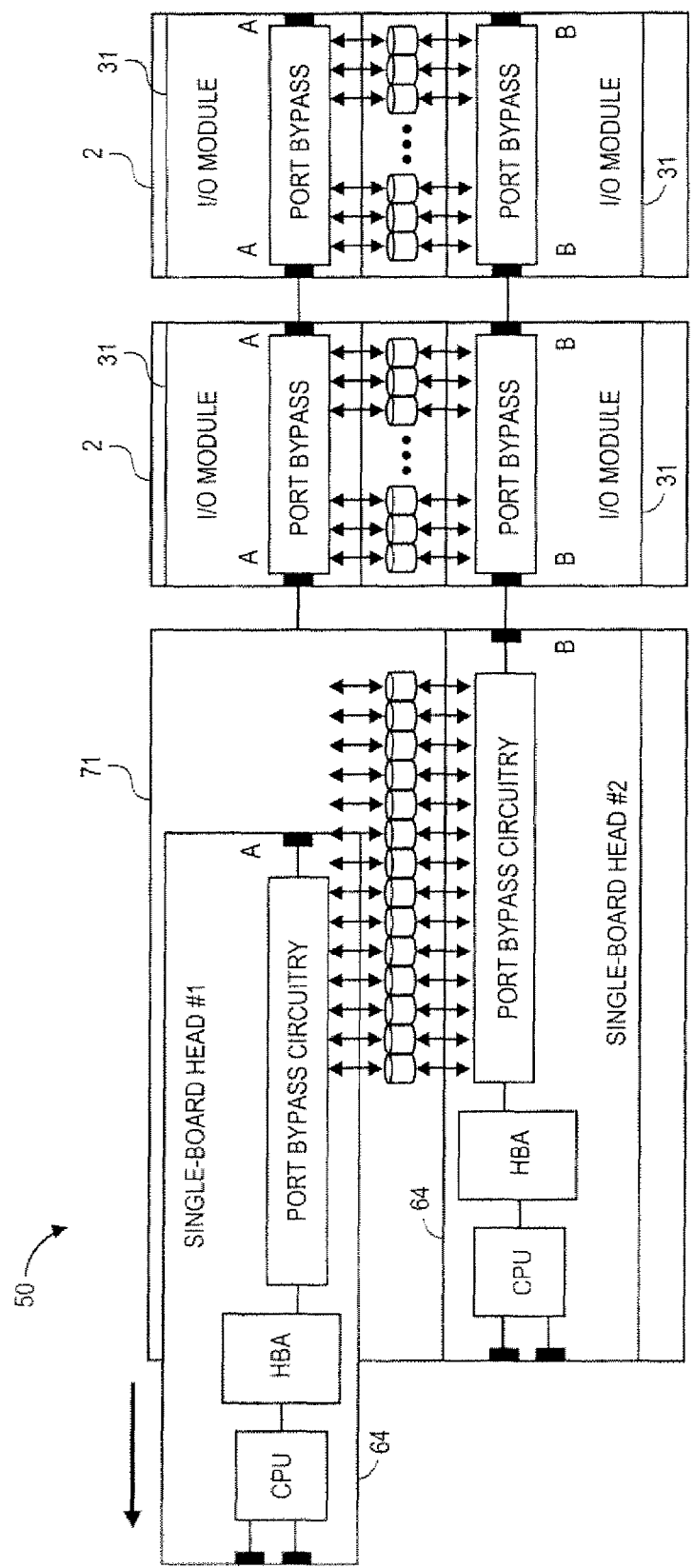
FIGS. 7 through 16 show the storage system in various states throughout the process of FIG. 6.
Figure 8:
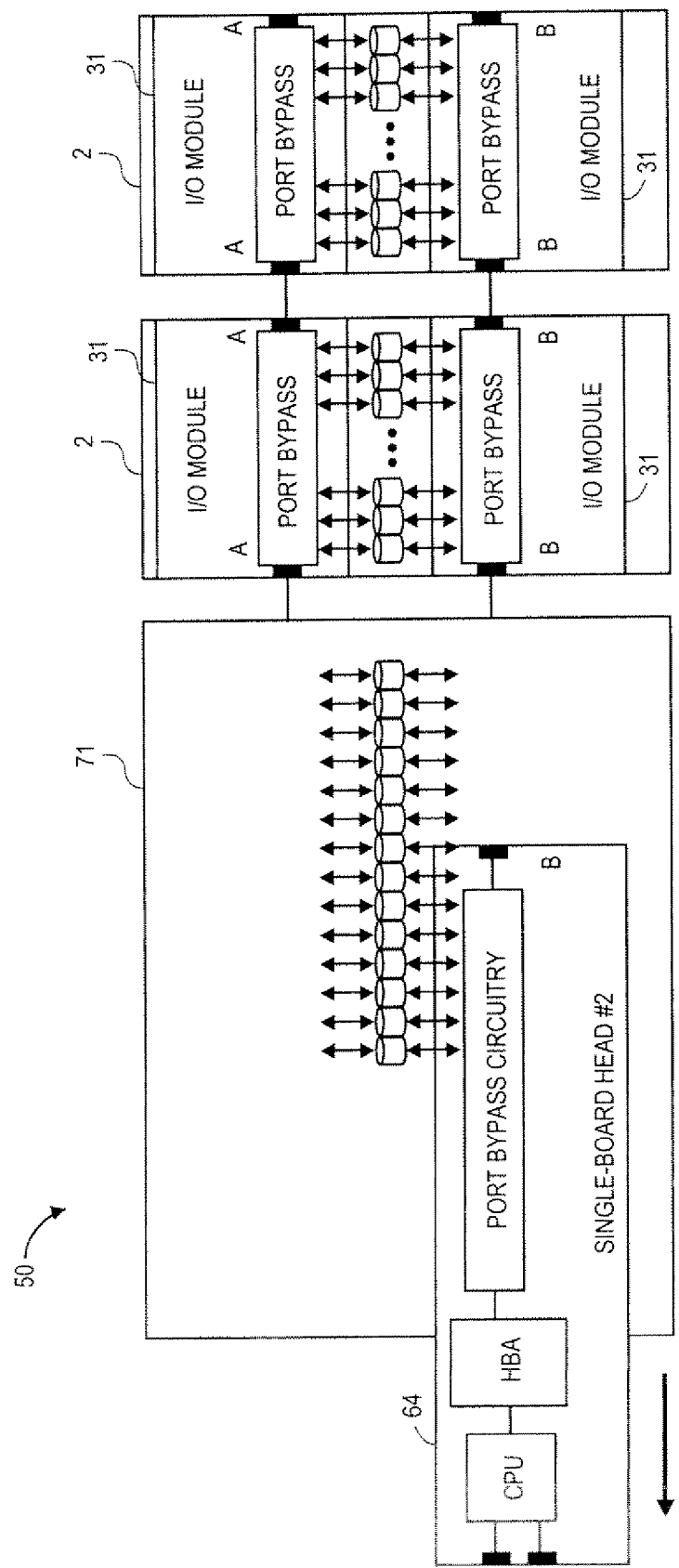
Figure 9:
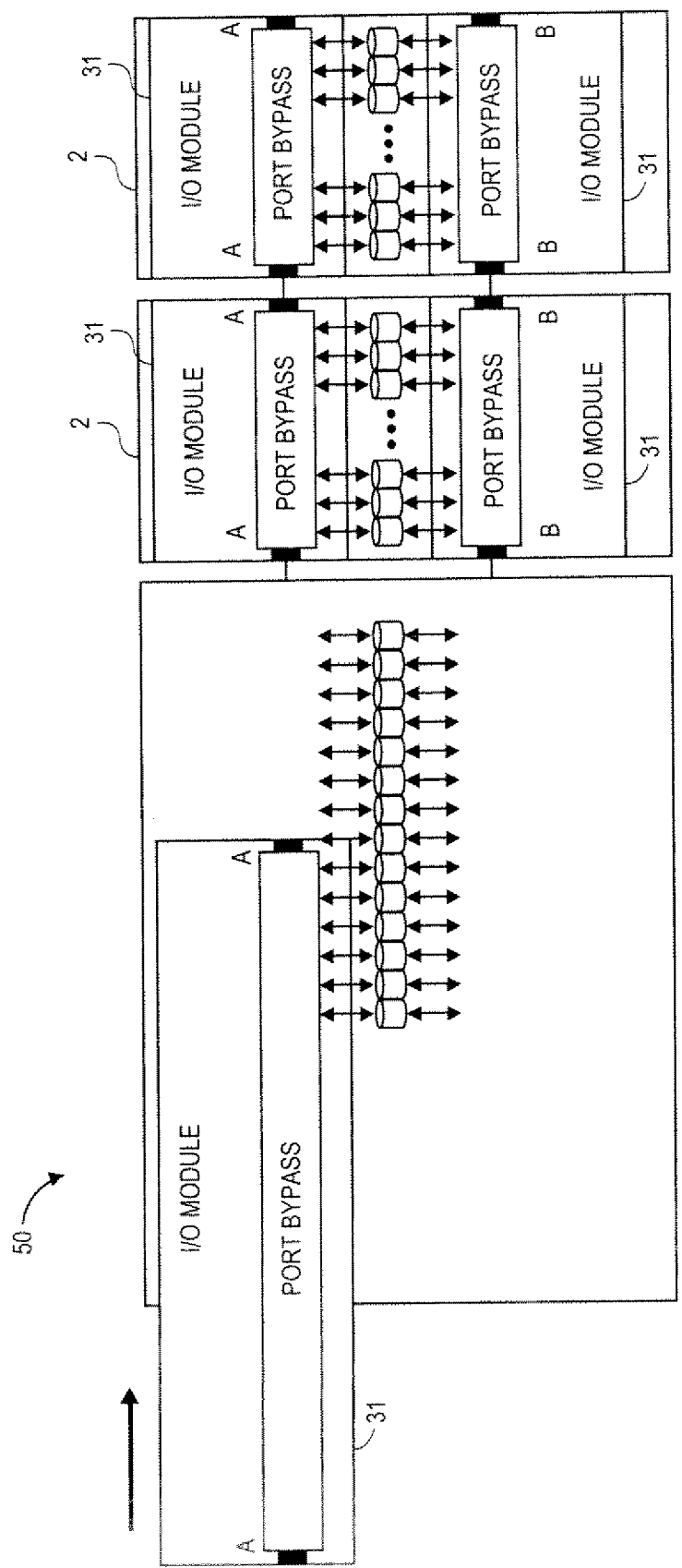
Figure 10:
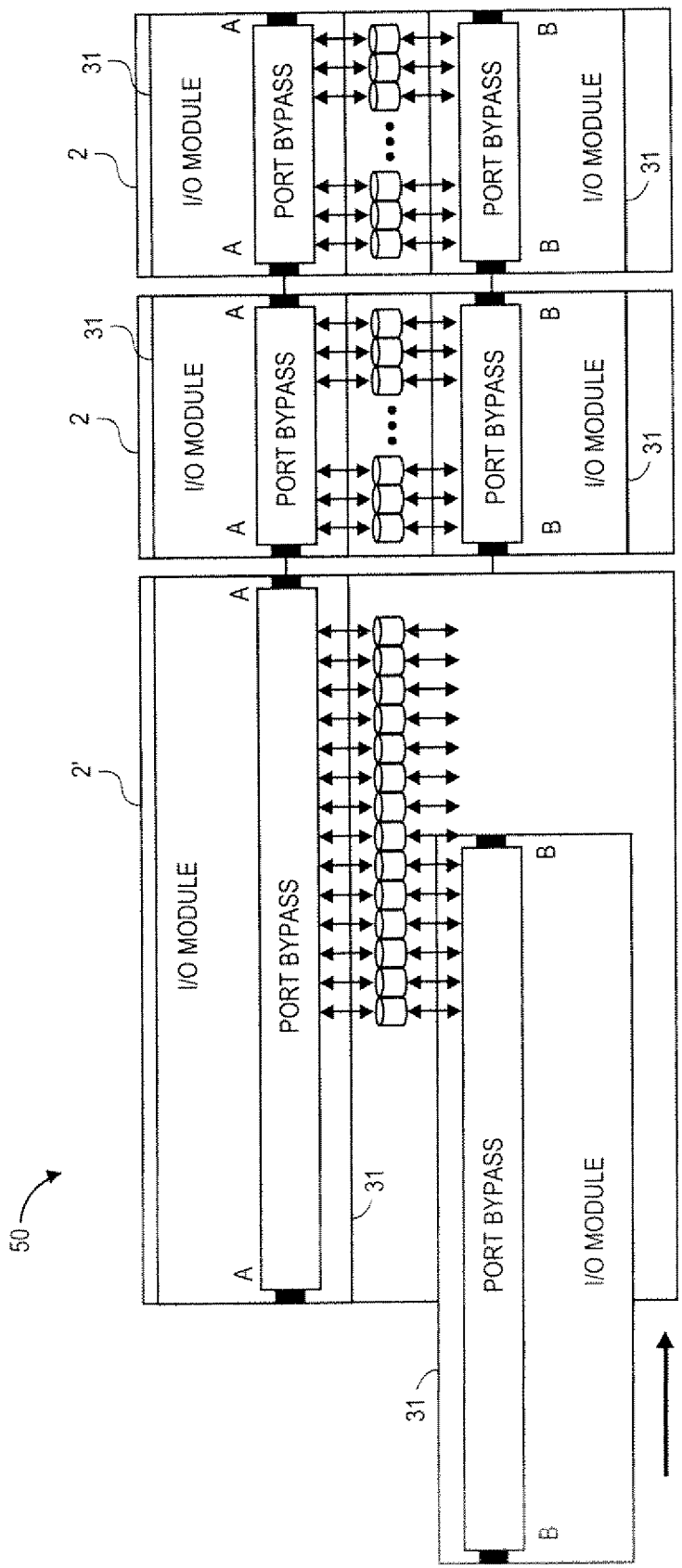
Figure 11:
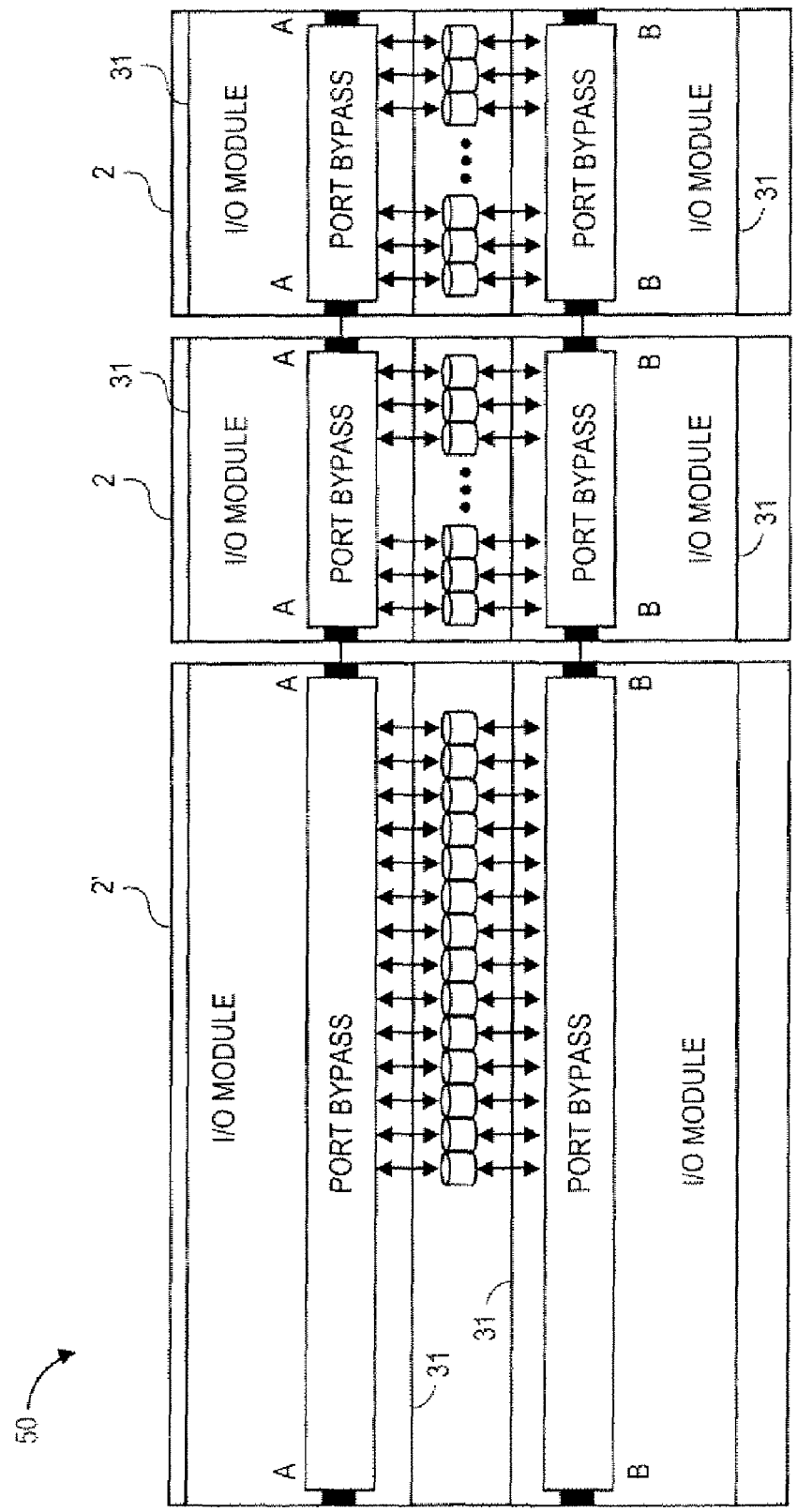

Next, the administrator powers down the standalone storage server 71 (block 606) along with its expansion JBOD shelves 2 and then disconnects the standalone storage server's network connections (not shown) (block 607). The administrator then removes each of the single-board heads 64 from the standalone storage system 71 (block 608), as shown in FIGS. 7 and 8. Next, as shown in FIGS. 9 and 10, the administrator installs I/O modules 31 in place of the removed single-board heads 64 (block 609). At this point, the unit which contained the standalone storage server 71 is no longer a standalone storage server, but is instead a JBOD shelf 2, as shown in FIG. 11. To distinguish this newly created JBOD shelf from the other JBOD shelves 2, this device is henceforth referred to as JBOD shelf 2'.

FIG. 12 shows the two modular heads 121, which will control the system once the conversion process is complete. The new system 120 initially comprises the two modular heads and two expansion JBOD shelves 2, identified as New Shelf #1 and New Shelf #2. The old system 50, which includes the newly created JBOD shelf 2' and its corresponding expansion shelves 2, will be integrated with the new system 120.

Figure 13:
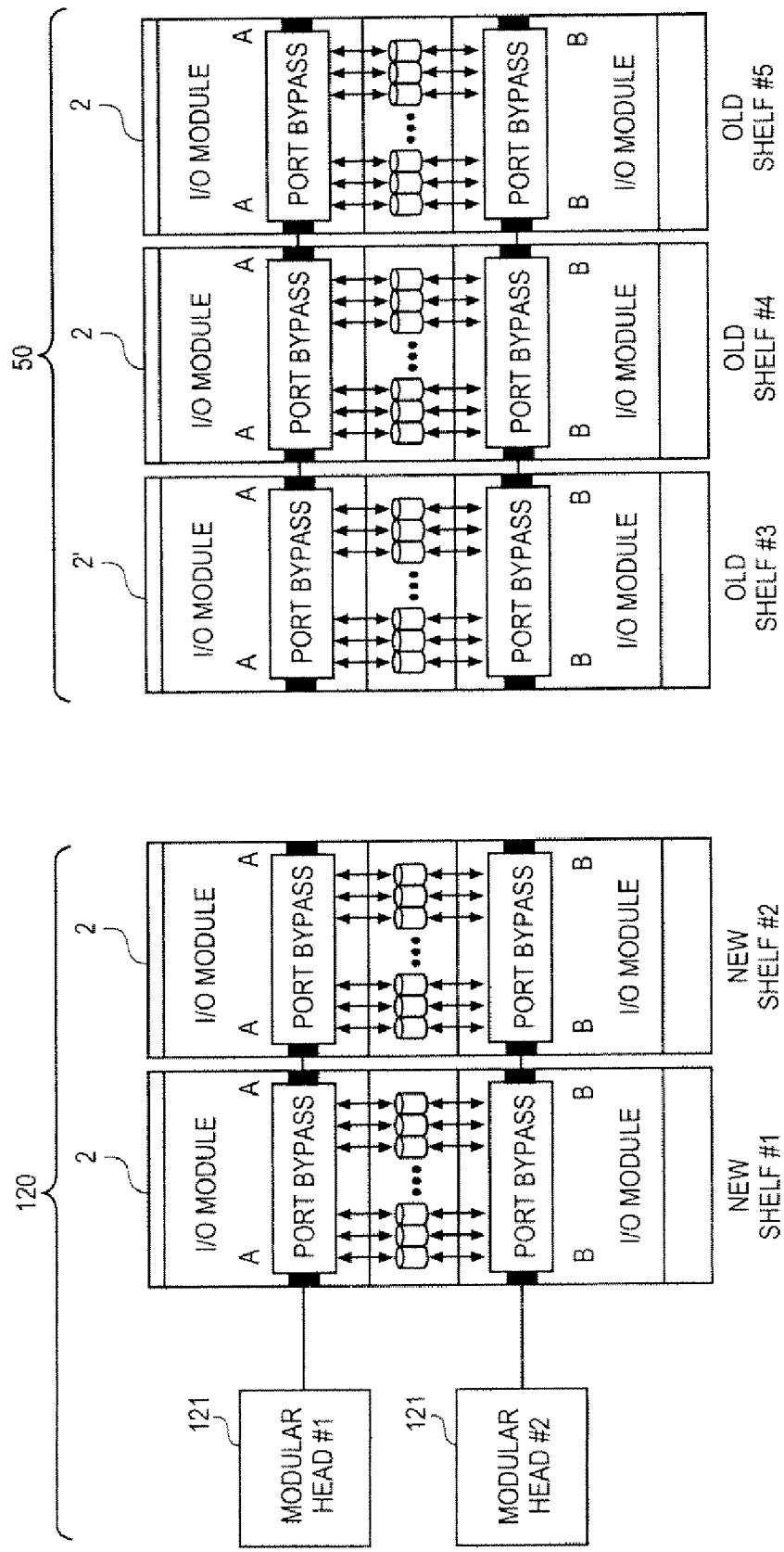
Figure 14:
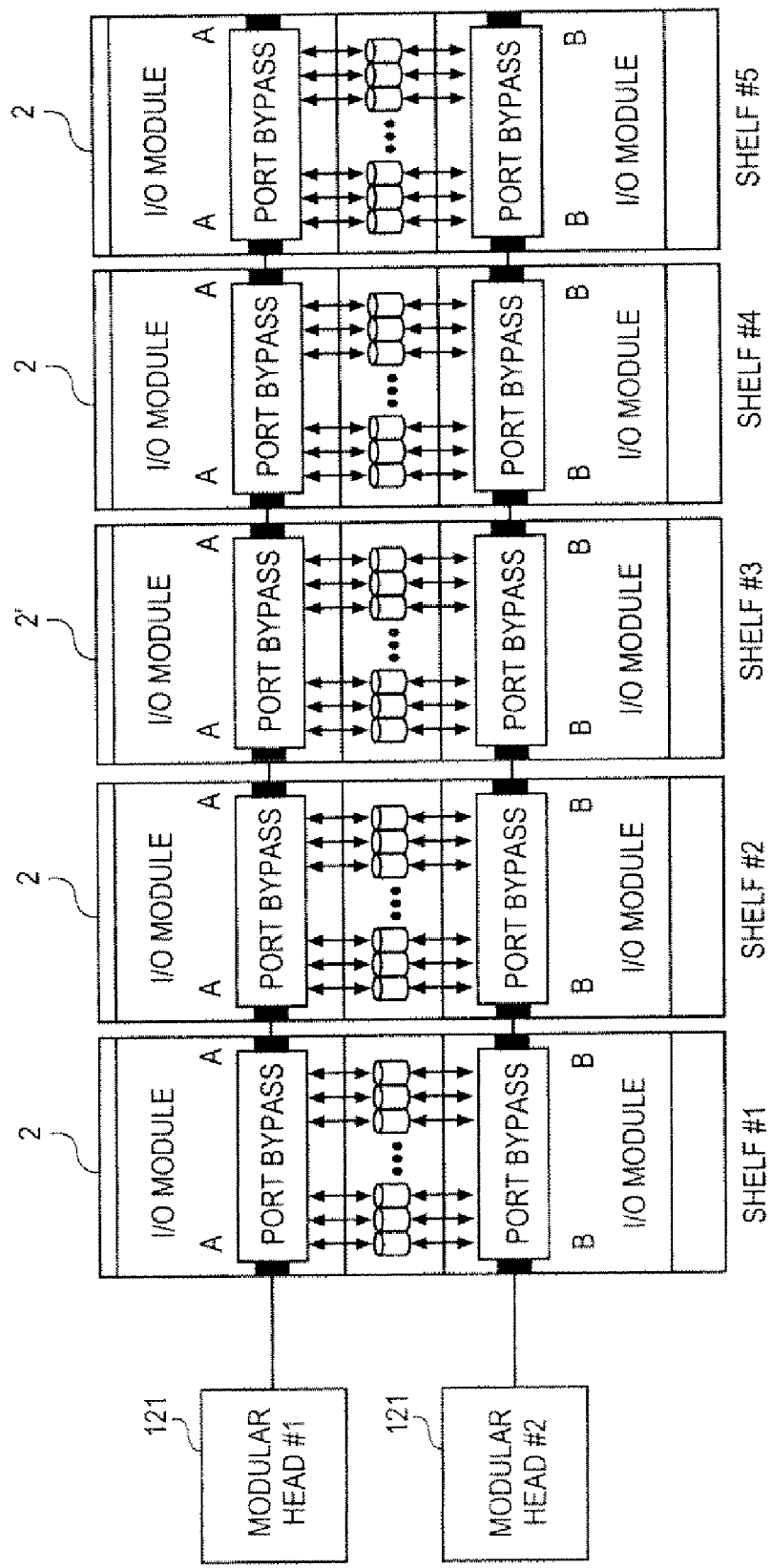

To continue to process, the administrator next changes the shelf identifiers (IDs) of the expansion shelves 2 in the old system 50 as necessary to make them unique with respect to the expansion shelves 2 in the new system 120 (block 610). It may be assumed that the shelf ID can be set by a physical switch on each shelf. For example, as shown in FIG. 13, Old Shelf #1, Old Shelf #2 and Old Shelf #3 in the old system 50 are renamed as Old Shelf #3, Old Shelf #4 and Old Shelf #5, respectively. The administrator then connects cables appropriately (block 611) to connect the shelves 2 and 2' of the old system 50 to the new system 120, as shown in FIG. 14. The administrator then appropriately configures the system to reflect the desired closed loop shelf topology (block 612). This may be accomplished using any of various techniques, such as by appropriately setting loop termination switches on the I/O modules, connecting a loopback plug to the downstream port of a shelf, etc.

Figure 15:
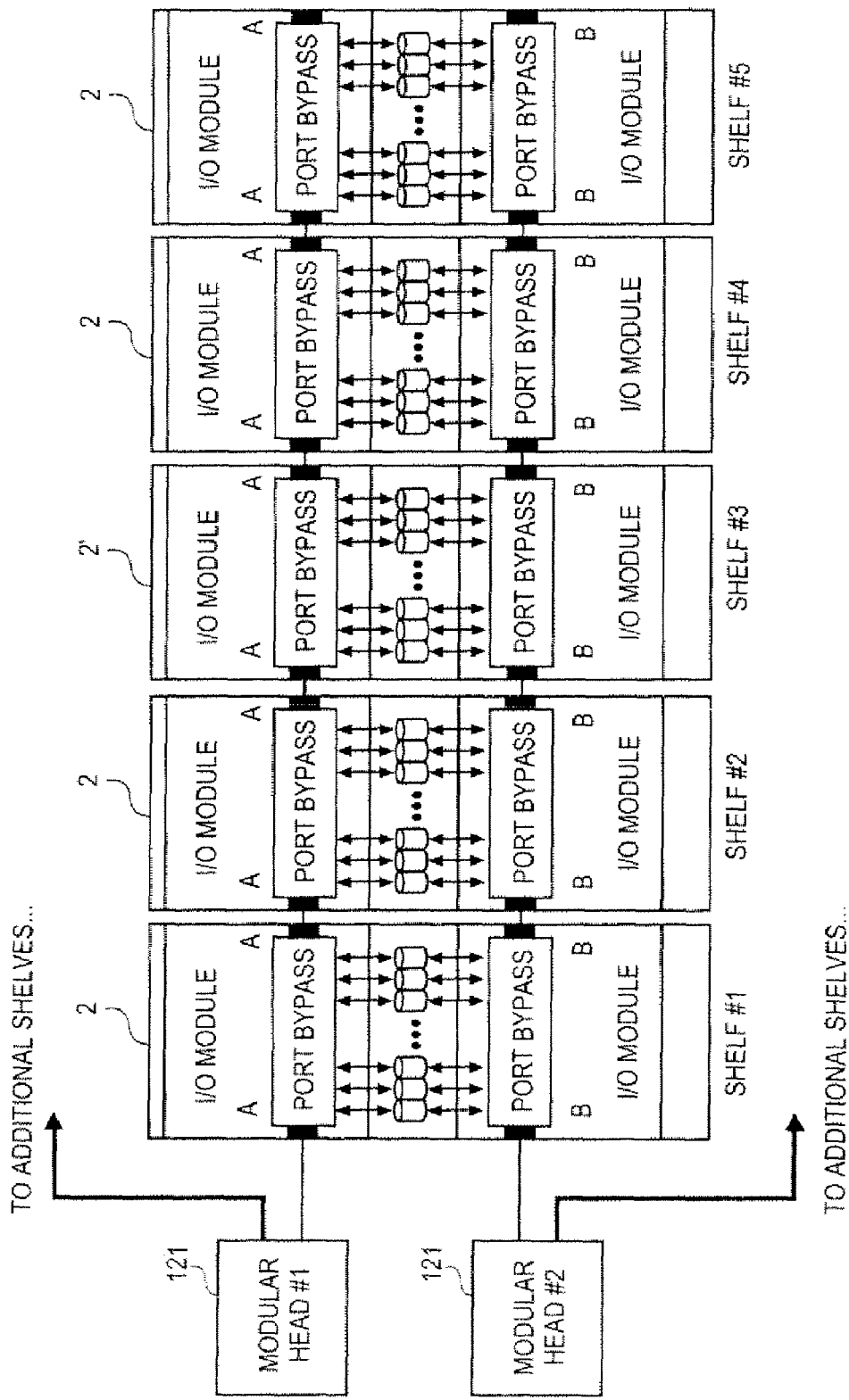
Figure 16:
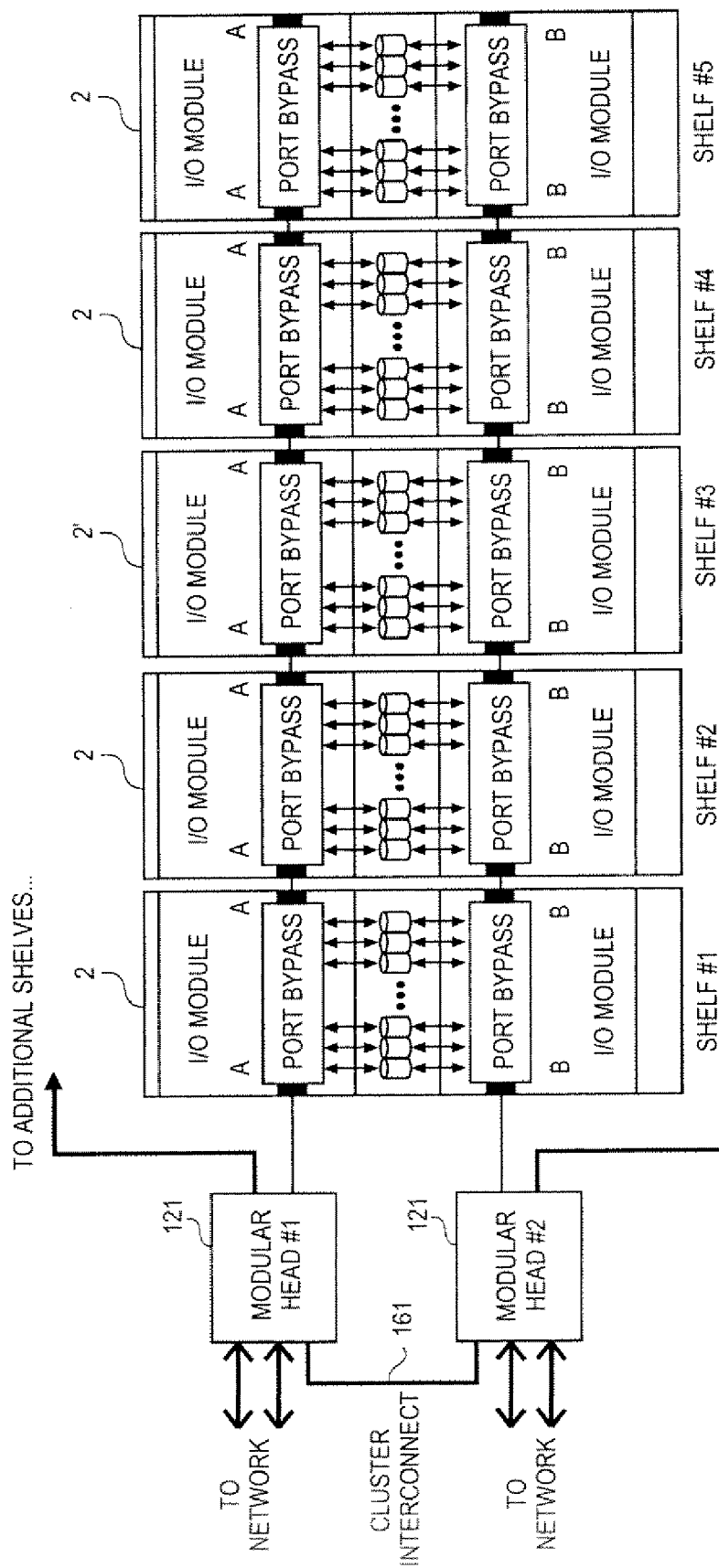

Next, the administrator adds additional shelves to the modular heads 121, if desired (block 613), as shown in FIG. 15, and then connects the cluster interconnect between the modular heads 121 and connects the modular heads 121 to the network (not shown) (block 614), as shown in FIG. 16. The administrator then powers on and boots up the modular heads 121 (block 615). FIG. 16 shows the final physical configuration of the system (excluding the clients and the network).

At this point, none of the disks from the old system 50 have a valid owner, since the single-board heads 64 are gone. Therefore, ownership of those disks must be reassigned. Continuing the process, therefore, the administrator next inputs a "disk show" command to modular head #1 (block 616) from an appropriate administrative console, to obtain a display identifying all of the disks in the system and an indication of the owner of each disk. The resulting display identifies all of the disks originally in the new system 120 as well as all of the disks from the old system 50. The resulting display indicates, however, that the disks from the old system 50 are not currently owned by modular head #1. Accordingly, the administrator inputs a "disk reassign" command to modular head #1 (block 617), passing as a parameter the name of single-board head #1. This command causes the disks previously owned by single-board head #1 to be reassigned to modular head #1. That is, modular head #1 now owns those disks as a result of this command. Examples of the specific actions performed in response to such a command to change disk ownership are described in Coatney and Sarma.

Next, the administrator inputs the "disk show" command to modular head #2 (block 618) from an appropriate administrative console. As indicated above, this command produces a display identifying all of the disks from the old system 50 and the new system 120. The administrator then inputs the "disk reassign" command to modular head #2 (block 619), passing as a parameter the name of single-board head #2. This command causes the disks previously owned by single-board head #2 to be reassigned to modular head #2.

The administrator then inputs the "disk show" command to display all disks in the system and verifies that all disks are owned by the correct head (block 620). Next, the administrator uses the "disk assign" command to assign any unowned drives (block 621) (some drives may be unowned if they were added to the system in block 613). Assuming ownership is verified to be correct, it is still necessary to reassign ownership at the volume level. A storage system such as described herein may comprise multiple "volumes", each of which may comprise multiple disks. After reassignment of disk ownership is complete, the volume(s) formed by the disks from the old system 50 will appear as foreign volumes to the modular heads 121. To correct this condition, therefore, the administrator inputs a "volume on-line" command to all of the modular heads 121, to reassign the volume(s) formed by the disks from the old system 50 to the modular heads 121 (block 622). If desired, the administrator can also delete the old root volume at this point, after which the conversion process is complete.

Thus, a method and apparatus to integrate a JBOD shelf, which has been converted from a standalone storage server, into a modular storage system have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of reconfiguring a storage system, the method comprising:

operating an integrated storage system which includes a plurality of mass storage devices installed in a chassis and a plurality of storage server heads installed in the chassis to control the mass storage devices in response to a set of clients, wherein each of the plurality of heads has ownership of a different subset of the plurality of mass storage devices, and each of the mass storage devices is owned by exactly one of the storage server heads, wherein each of the storage server heads is implemented on a separate, single circuit board;

disconnecting each of the storage server heads from the mass storage devices;

removing each of the separate, single circuit boards from the chassis;

installing a plurality of input/output modules in the chassis in a space previously occupied by the separate, single circuit boards;

connecting a plurality of external storage server head units to the mass storage devices installed in the chassis via the input/output modules; and using a software-based command to reassign ownership of the plurality of mass storage devices to the plurality of external storage server head units independently of how the mass storage devices and the external storage server head units are physically interconnected, without removing any of the mass storage devices from the chassis.

2. A method as recited in claim 1, wherein using a software-based command to reassign ownership of the plurality of mass storage devices comprises storing an ownership attribute on a storage medium in each of the plurality of mass storage devices.

3. A method as recited in claim 1, further comprising connecting the external storage server head units to a second plurality of mass storage devices installed in a second chassis, wherein one of the external storage server head units further has ownership of the second plurality of mass storage devices.

* * * * *